(12) United States Patent
Meyer-Teruel et al.

(10) Patent No.: US 11,888,389 B1
(45) Date of Patent: Jan. 30, 2024

(54) VARIABLE-PHASE POWER CONVERTER

(71) Applicant: VISTEON GLOBAL TECHNOLOGIES, INC., Van Buren Township, MI (US)

(72) Inventors: Fiona E. Meyer-Teruel, Detroit, MI (US); Julien Payan, Pontoise (FR); Kai Zhuang, Shanghai (CN); Tao Wang, Oakland Township, MI (US)

(73) Assignee: Visteon Global Technologies, Inc., Van Buren Township, MI (US)

(*) Notice: Subject to any disclaimer, the term of this patent is extended or adjusted under 35 U.S.C. 154(b) by 15 days.

(21) Appl. No.: 17/895,021

(22) Filed: Aug. 24, 2022

(51) Int. Cl.
*H02M 1/42* (2007.01)
*H02M 3/335* (2006.01)
*B60L 53/24* (2019.01)

(52) U.S. Cl.
CPC .......... *H02M 1/4216* (2013.01); *B60L 53/24* (2019.02); *H02M 3/33584* (2013.01); *B60L 2210/10* (2013.01)

(58) Field of Classification Search
CPC ...... H02M 1/42; H02M 1/4216; H02M 3/335; H02M 3/3384; H02M 7/217; H02M 7/219
See application file for complete search history.

(56) References Cited

U.S. PATENT DOCUMENTS

| | | | | |
|---|---|---|---|---|
| 5,631,550 A | * | 5/1997 | Castro | H02M 1/4216 323/283 |
| 2004/0160789 A1 | * | 8/2004 | Ying | H02J 9/062 363/16 |
| 2019/0291586 A1 | * | 9/2019 | Kim | B60L 15/007 |
| 2023/0035838 A1 | * | 2/2023 | Li | H02M 1/0009 |

* cited by examiner

Primary Examiner — Gary L Laxton
(74) Attorney, Agent, or Firm — Quinn IP Law

(57) ABSTRACT

A power converter incudes a power factor correction circuit and a controller. The power factor correction circuit is configured to convert an input single-phase electrical power to a first DC electrical power. An active phase of the input single-phase electrical power is received in parallel through two of four conductors. A return phase of the input single-phase electrical power is received in parallel through two others of the four conductors. The power factor correction circuit is also configured to convert an input three-phase electrical power to the first DC electrical power. Three active phases of the input three-phase electrical power are received through three of the four conductors. The return phase is received through a fourth of the four conductors. The controller is configured to control the power factor correction circuit to operate in the single-phase input mode and the three-phase input mode in response to a control signal.

20 Claims, 8 Drawing Sheets

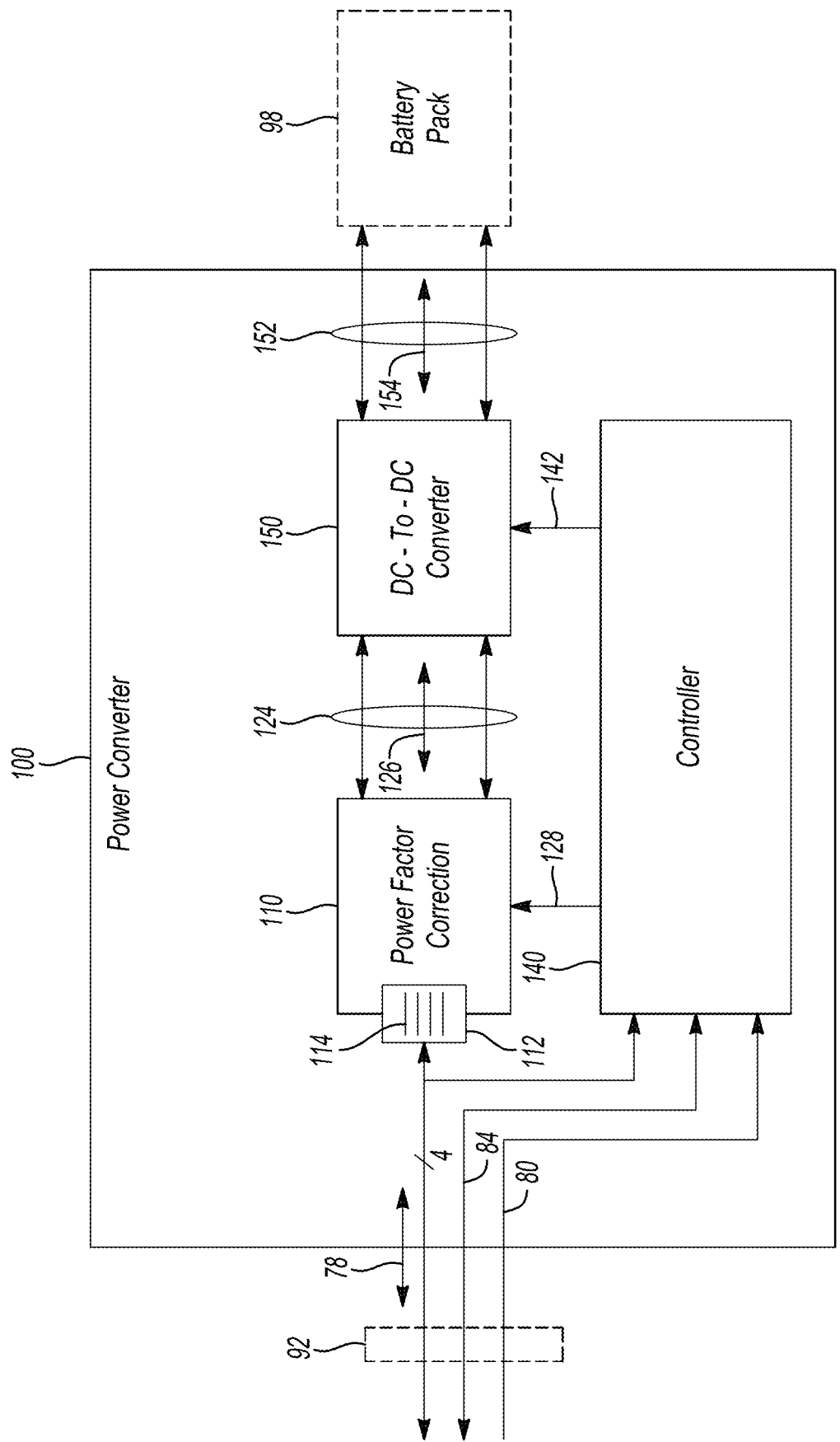

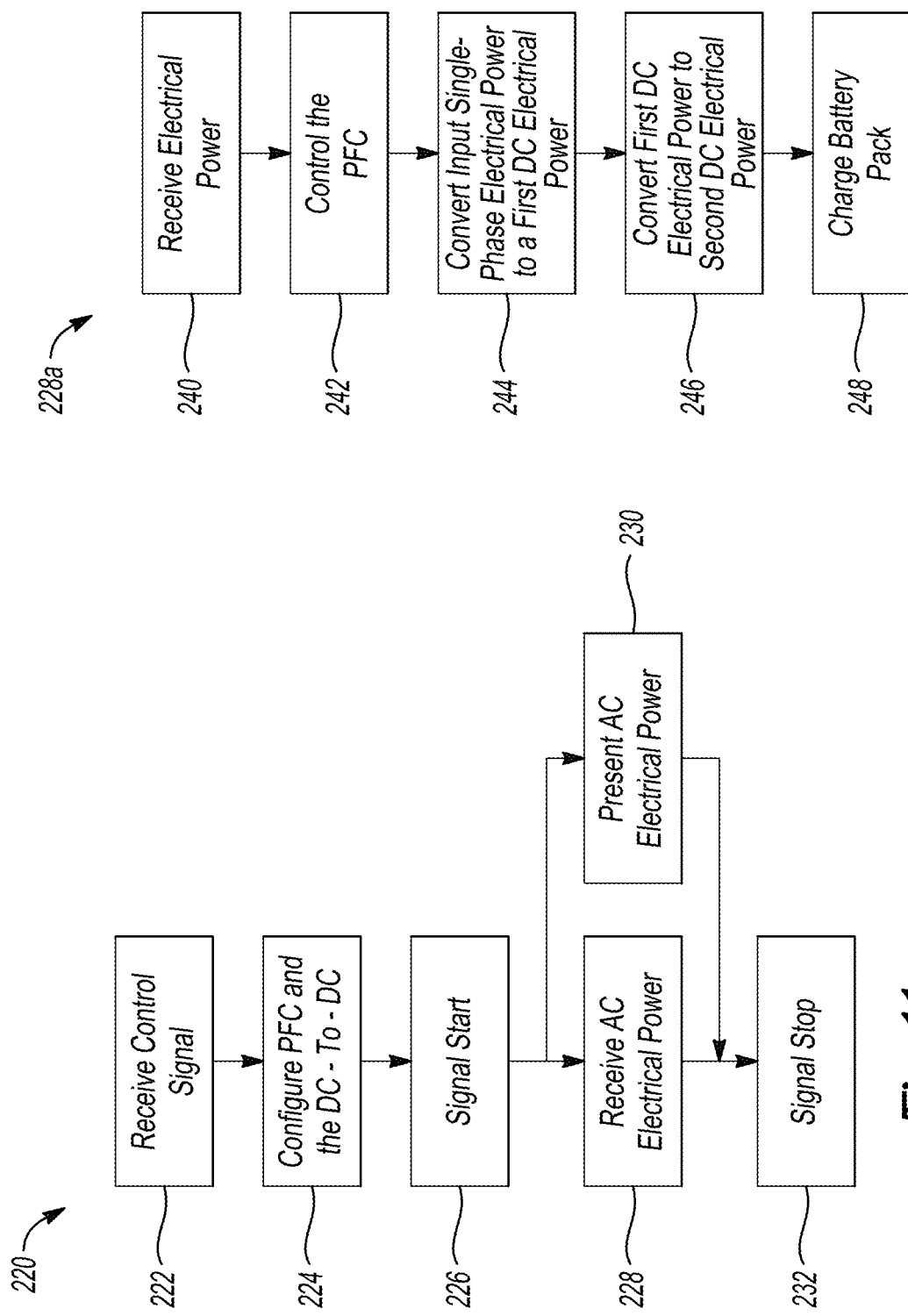

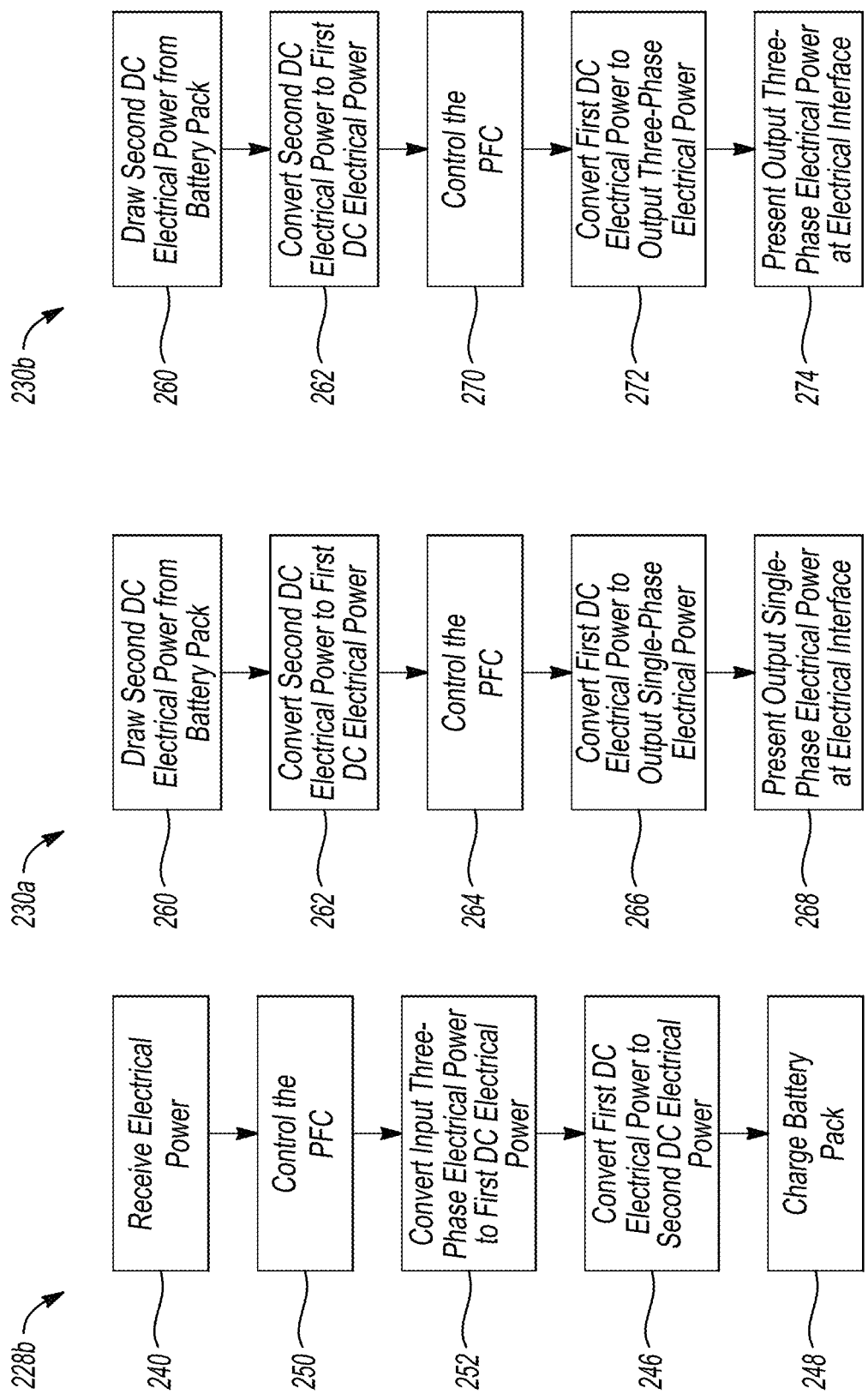

VARIABLE-PHASE POWER CONVERTER

TECHNICAL FIELD

The present disclosure generally relates to systems and methods for variable-phase power conversion.

BACKGROUND

Existing electric vehicles have on-vehicle charging devices that convert three-phase alternating-current (AC) electrical power to direct-current (DC) electrical power to charge onboard batteries. The charging devices implement power wires sized to accommodate active-phase currents received from charging stations. In some designs, larger return wires are implemented to accommodate ground currents where the charging stations have four-wire wye (Y) configurations.

Accordingly, those skilled in the art continue with research and development efforts in the field of onboard AC charging.

SUMMARY

A power converter is provided herein. The power converter includes a power factor correction circuit and a controller. The power factor correction circuit has an electrical interface with four interface conductors. The power factor correction circuit is configured to convert an input single-phase electrical power to a first DC electrical power while operating in a single-phase input mode. An active phase of the input single-phase electrical power is received in parallel through a first conductor and a second conductor of the four interface conductors. A return phase of the input single-phase electrical power is received in parallel through a third conductor and a fourth conductor of the four interface conductors. The power factor correction circuit is further configured to convert an input three-phase electrical power to the first DC electrical power while operating in a three-phase input mode. A first phase of the input three-phase electrical power is received through the first conductor of the four interface conductors. A second phase of the input three-phase electrical power is received through the second conductor of the four interface conductors. A third phase of the input three-phase electrical power is received through the third conductor of the four interface conductors. The return phase of the input three-phase electrical power the fourth conductor of the four interface conductors. The controller is configured to control the power factor correction circuit to operate in the single-phase input mode in response to a first command received via a control signal, and operate in the three-phase input mode in response to a second command received via the control signal.

In one or more embodiments of the power converter, the power factor correction circuit includes four inductors connected in series with the four interface conductors respectively, wherein the four interface conductors are configured to transfer four currents, a plurality of first transistors controlled by the controller to selectively switch the four inductors to a first power bus, and a plurality of second transistors controlled by the controller to selectively switch the four inductors to a second power bus, wherein the first DC electrical power is established between the first power bus and the second power bus.

In one or more embodiments of the power converter, the plurality of second transistors switch the four inductors to the second power bus in response to a voltage of the active phase relative to the return phase being greater than zero volts and the four amplitudes of the four currents in the four inductors are rising while in the single-phase input mode.

In one or more embodiments of the power converter, the plurality of first transistors switch two of the four inductors to the first power bus in response to the voltage of the active phase relative to the return phase being greater than zero volts and the four amplitudes of the four currents in the four inductors are falling while in the single-phase input mode, and the plurality of second transistors switch two of the four inductors to the second power bus in response to the voltage of the active phase relative to the return phase being greater than zero volts and the four amplitudes of the four currents in the four inductors are falling while in the single-phase input mode.

In one or more embodiments of the power converter, the plurality of second transistors switch the four inductors to the second power bus in response to the voltage of the active phase relative to the return phase being less than zero volts and the four amplitudes of the four currents in the four inductors are rising while in the single-phase input mode.

In one or more embodiments of the power converter, the plurality of first transistors switch two of the four inductors to the first power bus in response to a voltage of the active phase relative to the return phase being less than zero volts and the four amplitudes of the four currents in the four inductors are falling while in the single-phase input mode, and the plurality of second transistors switch two of the four inductors to the second power bus in response to the voltage of the active phase relative to the return phase being less than zero volts and the four amplitudes of the four currents in the four inductors are falling while in the single-phase input mode.

In one or more embodiments, the power converter includes a DC-to-DC converter configured to convert the first DC electrical power to a second DC electrical power. The second DC electrical power has a different voltage than the first DC electrical power.

In one or more embodiments of the power converter, the power factor correction circuit is further configured to convert the first DC electrical power to an output single-phase electrical power while operating in a single-phase output mode, present the output single-phase electrical power at the electrical interface, convert the first DC electrical power to an output three-phase electrical power while operating in a three-phase output mode, and present the output three-phase electrical power at the electrical interface. The controller is further configured to control the power factor correction circuit to operate in the single-phase output mode in response to a third command received via the control signal, and operate in the three-phase output mode in response to a fourth command received via the control signal.

In one or more embodiments of the power converter, the power factor correction circuit and the controller are implemented in a vehicle.

A method for power conversion is provided herein. The method includes receiving electrical power through four interface conductors of an electrical interface of a power factor correction circuit, and converting an input single-phase electrical power to a first DC electrical power in the power factor correction circuit operating in a single-phase input mode. An active phase of the input single-phase electrical power is received in parallel through a first conductor and a second conductor of the four interface conductors. A return phase of the input single-phase electrical power is received in parallel through a third conductor and a fourth conductor of the four interface conductors. The method further includes converting an input three-phase electrical power to the first DC electrical power in the power factor correction circuit operating in a three-phase input mode. A first phase of the input three-phase electrical power is received through the first conductor of the four interface conductors. A second phase of the input three-phase electrical power is received through the second conductor of the four interface conductors. A third phase of the input three-phase electrical power is received through the third conductor of the four interface conductors. The return phase of the input three-phase electrical power the fourth conductor of the four interface conductors. The method includes controlling the power factor correction circuit with a controller to operate in the single-phase input mode in response to a first command received via a control signal, and controlling the power factor correction circuit with the controller to operate in the three-phase input mode in response to a second command received via the control signal.

In one or more embodiments of the method, the power factor correction circuit includes four inductors connected in series with the four interface conductors respectively. The four interface conductors are configured to transfer four currents. The power factor correction circuit includes plurality of first transistors controlled by the controller to selectively switch the four inductors to a first power bus, and a plurality of second transistors controlled by the controller to selectively switch the four inductors to a second power bus. The first DC electrical power is established between the first power bus and the second power bus.

In one or more embodiments, the method includes switching the four inductors through the plurality of second transistors to the second power bus in response to a voltage of the active phase relative to the return phase being greater than zero volts and the four amplitudes of the four currents in the four inductors are rising while in the single-phase input mode.

In one or more embodiments, the method includes switching two of the four inductors through the plurality of first transistors to the first power bus in response to the voltage of the active phase relative to the return phase being greater than zero volts and the four amplitudes of the four currents in the four inductors are falling while in the single-phase input mode, and switching two of the four inductors through the plurality of second transistors to the second power bus in response to the voltage of the active phase relative to the return phase being greater than zero volts and the four amplitudes of the four currents in the four inductors are falling while in the single-phase input mode.

In one or more embodiments, the method includes switching the four inductors through the plurality of second transistors to the second power bus in response to the voltage of the active phase relative to the return phase being less than zero volts and the four amplitudes of the four currents in the four inductors are rising while in the single-phase input mode.

In one or more embodiments, the method includes switching two of the four inductors through the plurality of first transistors to the first power bus in response to a voltage of the active phase relative to the return phase being less than zero volts and the four amplitudes of the four currents in the four inductors are falling while in the single-phase input mode, and switching two of the four inductors through the plurality of second transistors to the second power bus in response to the voltage of the active phase relative to the return phase being less than zero volts and the four amplitudes of the four currents in the four inductors are falling while in the single-phase input mode.

In one or more embodiments, the method includes converting the first DC electrical power to a second DC electrical power, wherein the second DC electrical power has a different voltage than the first DC electrical power.

In one or more embodiments, the method includes converting the first DC electrical power to an output single-phase electrical power in the power factor correction circuit operating in a single-phase output mode, presenting the output single-phase electrical power at the electrical interface, converting the first DC electrical power to an output three-phase electrical power in the power factor correction circuit operating in a three-phase output mode, presenting the output three-phase electrical power at the electrical interface, controlling the power factor correction circuit to operate in the single-phase output mode in response to a third command received via the control signal, and controlling the power factor correction circuit to operate in the three-phase output mode in response to a fourth command received via the control signal.

A vehicle is provided herein. The vehicle includes a charging socket, a power factor correction circuit, and a controller. The charging socket has at least four socket conductors. The power factor correction circuit is electrically connected to the charging socket. The power factor correction circuit is configured to convert an input single-phase electrical power to a first DC electrical power while operating in a single-phase input mode. An active phase of the input single-phase electrical power is received in parallel through a first socket conductor and a second socket conductor of the four socket conductors. A return phase of the input single-phase electrical power is received in parallel through a third socket conductor and a fourth socket conductor of the four socket conductors. The power factor correction circuit is configured to convert an input three-phase electrical power to the first DC electrical power while operating in a three-phase input mode. A first phase of the input three-phase electrical power is received through the first socket conductor of the four socket conductors. A second phase of the input three-phase electrical power is received through the second socket conductor of the four socket conductors. A third phase of the input three-phase electrical power is received through the third socket conductor of the four socket conductors. The return phase of the input three-phase electrical power the fourth socket conductor of the four socket conductors. The controller is configured to control the power factor correction circuit to operate in the single-phase input mode in response to a first command received via a control signal, and operate in the three-phase input mode in response to a second command received via the control signal.

In one or more embodiments, the vehicle includes a DC-to-DC converter configured to bidirectionally convert between the first DC electrical power and a second DC electrical power. The second DC electrical power has a different voltage than the first DC electrical power. The vehicle includes a battery pack electrically coupled to the DC-to-DC converter, configured to receive the second DC electrical power from the DC-to-DC converter while in a charging mode, and configured to present the second DC electrical power to the DC-to-DC converter while in a discharging mode.

In one or more embodiments of the vehicle, the power factor correction circuit is further configured to convert the first DC electrical power to an output single-phase electrical power while operating in a single-phase output mode, present the output single-phase electrical power to the charging socket, convert the first DC electrical power to an output three-phase electrical power while operating in a three-phase output mode, and present the output three-phase electrical power to the charging socket. The controller is further configured to control the power factor correction circuit to operate in the single-phase output mode in response to a third command received via the control signal, and operate in the three-phase output mode in response to a fourth command received via the control signal.

The above features and advantages and other features and advantages of the present teachings are readily apparent from the following detailed description of the best modes for carrying out the teachings when taken in connection with the accompanying drawings.

BRIEF DESCRIPTION OF THE DRAWINGS

FIG. 2 is a schematic block diagram of a power converter in accordance with one or more exemplary embodiments.

FIG. 11 is a flow diagram of a method for power conversion in accordance with one or more exemplary embodiments.

FIG. 12 is a flow diagram of a method for receiving single-phase electrical power in accordance with one or more exemplary embodiments.

FIG. 13 is a flow diagram of a method for receiving three-phase electrical power in accordance with one or more exemplary embodiments.

FIG. 14 is a flow diagram of a method for presenting single-phase electrical power in accordance with one or more exemplary embodiments.

FIG. 15 is a flow diagram of a method for presenting three-phase electrical power in accordance with one or more exemplary embodiments.

Figure 1:
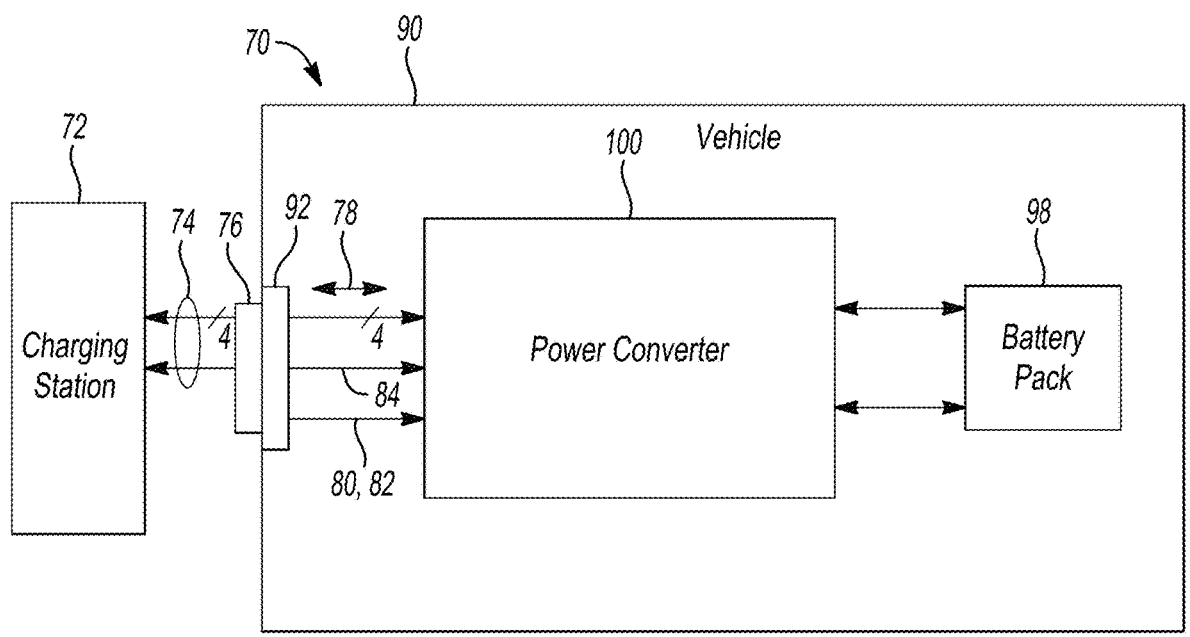
FIG. 1 is a schematic diagram illustrating a context of a system in accordance with one or more exemplary embodiments.

The present disclosure may have various modifications and alternative forms, and some representative embodiments are shown by way of example in the drawings and will be described in detail herein. Novel aspects of this disclosure are not limited to the particular forms illustrated in the above-enumerated drawings. Rather, the disclosure is to cover modifications, equivalents, and combinations falling within the scope of the disclosure as encompassed by the appended claims.

DETAILED DESCRIPTION

Embodiments of the disclosure generally provide for a power converter that uses a 3-phase totem-pole as the power factor correction (PFC) topology. The power converter may be unidirectional and/or bidirectional. For on-vehicle applications, the power converter implements an onboard charger (OBC) that converts alternating-current (AC) electrical power to direct-current (DC) electrical power (e.g., during battery charging) and/or vice-versa when the directionality is reversed (e.g., during vehicle-to-everything (V2X)) electrical power transfers. The battery charging may be Level 1 AC and/or Level 2 AC charging.

The power converter includes a bridgeless totem pole power factor correction circuit, a DC-to-DC converter, and a controller. The power factor correction circuit has four conductors for the AC electrical power. The conductors are referred to as first line (L1), a second line (L2), a third line (L3), and a neutral line (N). While operating with single-phase AC electrical power, two conductors (e.g., L1 and L2) are used in parallel to carry an active phase of the electrical power, and the other two conductors (e.g., L3 and N) are used in parallel to carry a return phase. While operating with three-phase AC electrical power, three conductors (e.g., L1, L2 and L3) are used to carry the three respective active phases of the electrical power, and one conductor (e.g., N) is used to carry the return phase.

Referring to FIG. 1, a schematic diagram illustrating a context of a system 70 is shown in accordance with one or more exemplary embodiments. The system 70 generally includes a charging station 72 and a vehicle 90. The charging station 72 includes a charging cable 74 and a charging plug 76. The vehicle 90 includes a charging socket 92, a battery pack 98, and a power converter 100.

Electrical power 78 may flow between the charging station 72 and the power converter 100 in either direction via the charging cable 74, the charging plug 76 and the charging socket 92. In some situations, the electrical power 78 may be single-phase alternating-current (AC) electrical power. In other situations, the electrical power 78 may be three-phase AC electrical power.

A control signal 80 may be presented from the charging plug 76, through the charging socket 92 to the power converter 100. The control signal 80 may convey one of multiple commands 82 to power converter 100. The commands 82 instruct the power converter 100 a number of phases in the electrical power 78 and a direction that the electrical power 78 is flowing (e.g., into the power converter 100 via the charging socket 92 or out of the charging socket 92 from the power converter 100.

A communication signal 84 may be exchanged between the charging station 72 and the power converter 100 via the charging cable 74, the charging plug 76, and the charging socket 92. The communication signal 84 may provide standard signaling information between the charging station 72 and the power converter 100 to start, control, and stop the flow of the electrical power 78.

The charging station 72 is operational to provide electrical power (e.g., electrical current at a voltage) to the vehicle 90 to recharge onboard batteries of the vehicle 90. In various embodiments, the charging stations 72 may be compliant with the SAE International J1772 standard and/or the International Electrotechnical Commission (IEC) 61851-1 standard. The charging stations 72 may be a Level 1 AC or a Level 2 AC charger. Other charging standards may be implemented to meet the design criteria of a particular application. Some charging stations 72 may be placed at fixed locations. Other charging stations 72 may be mobile.

The charging plug 76 implements an electric charging handle. The charging socket 92 implements a vehicle charging receptacle. The charging plug 76 is connectable and disconnectable from the charging socket 92. The charging plug 76 and the charging socket 92 are operational to transfer the electrical power 78, control signal 80, and the communication signal 84 between the charging station 72 and the vehicle 90.

The vehicle 90 implements an electric-powered vehicle, a hybrid vehicle, or a plug-in hybrid vehicle. In various embodiments, the vehicle 90 may be compliant with the SAE International J1772 standard and/or the International Electrotechnical Commission (IEC) 61851-1 standard. The vehicles 90 may implement Level 1 AC and/or Level 2 AC charging capabilities. Other standards may be implemented to meet the design criteria of a particular application. In various embodiments, the vehicle 90 may include, but is not limited to, a passenger vehicle, a truck, an autonomous vehicle, a motorcycle, a boat, and/or an aircraft. In some embodiments, the vehicles 90 may be a stationary object such as a room, a booth and/or a structure. Other types of vehicles 90 may be implemented to meet the design criteria of a particular application.

The battery pack 98 implements as a high-voltage rechargeable energy storage system. The battery pack 98 is configured to store electrical energy. The battery pack 98 is generally operational to receive electrical power from the power converter 100 and provide electrical power to the power converter 100. The battery pack 98 may include multiple battery modules electrically connected in series and/or in parallel. In various embodiments, the battery pack 98 may provide approximately 200 to 1000 volts DC (direct current) electrical potential. Other battery voltages may be implemented to meet the design criteria of a particular application.

The power converter 100 is operational to accept or alternately provide single-phase AC electrical power and three-phase AC electrical power (e.g., electrical power 78). While operating in a single-phase input mode, the power converter 100 is operational to convert an input single-phase electrical power to a first direct-current (DC) electrical power. The first DC electrical power may be converted to a second DC electrical power suitable for charging the battery pack 98. While operating in a three-phase input mode, the power converter 100 is operational to convert an input three-phase electrical power to the first DC electrical power. The first DC electrical power may be converted to the second DC electrical power suitable for charging the battery pack 98. While operating in a single-phase output mode, the power converter 100 may receive the second DC electrical power from the battery pack 98, convert the second DC electrical power to the first DC electrical power, and subsequently convert the first DC electrical power to an output single-phase AC electrical power. While operating in a three-phase output mode, the power converter 100 may receive the second DC electrical power from the battery pack 98, convert the second DC electrical power to the first DC electrical power, and subsequently convert the first DC electrical power to an output three-phase AC electrical power. In various embodiments, the power converter 100 may be located in the vehicle 90. In other embodiments, the power converter 100 may reside at a fixed location.

Referring to FIG. 2, a schematic block diagram of an example implementation of the power converter 100 is shown in accordance with one or more exemplary embodiments. The power converter 100 generally includes a power factor correction circuit 110, a controller 140, and a DC-to-DC converter 150. The power factor correction circuit 110 includes an electrical interface 112 and a first DC electrical interface 124.

The electrical power 78 is connected to the electrical interface 112 of the power factor correction circuit 110, and to the controller 140. The control signal 80 is received by the controller 140. A switching signal 128 is generated by the controller 140 and is received by the power factor correction circuit 110. The switching signal 128 carries switching information that controls the power factor correction circuit 110. A DC conversion signal 142 is generated by the controller 140 and presented to the DC-to-DC converter 150. The DC conversion signal 142 conveys more switching information that controls the DC-to-DC converter 150.

The power factor correction circuit 110 implements a bridgeless totem pole power factor correction circuit. The power factor correction circuit 110 is operational in a single-phase input mode to convert single-phase AC electrical power 78 received at the electrical interface 112 to the first DC electrical power 126 at the first DC electrical interface 124 as controlled by the switching signal 128. In a three-phase input mode, the power factor correction circuit 110 is operational to convert three-phase AC electrical power 78 received at the electrical interface 112 to the first DC electrical power 126 at the first DC electrical interface 124 as controlled by the switching signal 128. The power factor correction circuit 110 is operational in a single-phase output mode to convert the first DC electrical power 126 at the first DC electrical interface 124 into single-phase AC electrical power 78 presented at the electrical interface 112 as controlled by the switching signal 128. In a three-phase output mode, the power factor correction circuit 110 is operational to convert the first DC electrical power 126 received at the first DC electrical interface 124 into three-phase AC electrical power 78 presented at the electrical interface 112 as controlled by the switching signal 128.

The controller 140 implements one or more processors executing software. The software may be stored in non-transitory computer readable media (e.g., nonvolatile memory). The software, when executed by the processors, may cause the processors to generate the switching signal 128 and the DC conversion signal 142. Generation of the switching signal 128 and the DC conversion signal 142 is based on the voltage and phase of the electrical power signal 78, the commands 82 in the control signal 80, and the information in the communication signal 84.

The DC-to-DC converter 150 implements a unidirectional and/or a bidirectional converter of DC electrical power. Operations of the DC-to-DC converter 150 are governed by the controller 140 via the DC conversion signal 142. In a charging mode of operation, the DC-to-DC converter 150 converts the first DC electrical power 126 received at the first DC electrical interface 124 to second DC electrical power 154 presented at the second DC electrical interface 152. In a discharging mode of operation, the DC-to-DC converter 150 converts the second DC electrical power 154 received at the second DC electrical interface 152 to the first DC electrical power 126 at the first DC electrical interface 124. The second DC electrical power 154 generally has a different (e.g., higher) voltage (e.g., 800 volts) than the first DC electrical power 126 (e.g., 200 volts).

Figure 3:
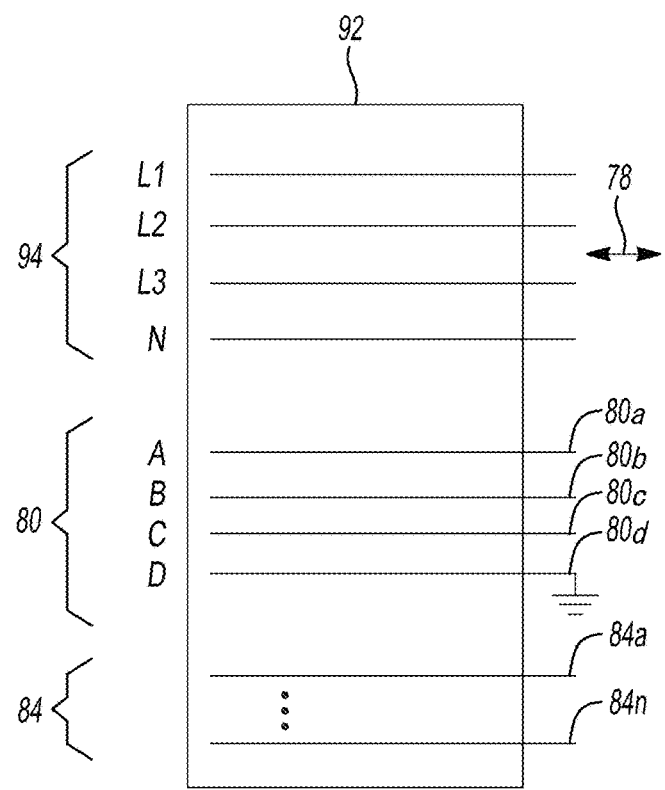
FIG. 3 is a schematic diagram of a charging socket in accordance with one or more exemplary embodiments.

Referring to FIGS. 2 and 3, a schematic diagram of an example implementation of the charging socket 92 is shown in accordance with one or more exemplary embodiments. The charging socket 92 includes multiple communication conductors 84a-84n for the communication signal 84, four socket conductors 94, and multiple control connectors 80a-80d for the control signal 80. The four socket conductors 94 include the first line L1, the second line L2, the third line L3 and the neutral line N. The communication conductors 84a-84n are coupled to the controller 140. The four socket conductors 94 may be coupled to the power factor correction circuit 110 and the controller 140. The control connectors 80a-80d are coupled to the controller 140.

The communication signal 84 may be compliant with the SAE International J1772 standard and/or the International Electrotechnical Commission (IEC) 61851-1 standard. The communication signal 84 may be conveyed via the communication conductors 84a-84n.

In the three-phase input mode and the three-phase output mode, the first line L1, the second line L2 and the third line L3 of the four socket conductors 94 correspond to the individual active phases of the three-phase electrical signal 78. The neutral line N corresponds to the return. In the single-phase input mode and the single-phase output mode, the first line L1 and the second line L2 operate in parallel as the active phase input. The third line L3 and the neutral line N operate in parallel as the return. Variations of the lines L1, L2, L3 and N may include using the first line L1 and the third line L3 for the active phase and the second L2 and the neutral line N for the return, or the second line L2 and the third line L3 for the active phase and the first line L1 and the neutral line N for the return.

The control connectors 80a-80d may provide a coded signal to inform the controller 140 that a particular one among the multiple (e.g., four) modes of operation should be performed. For example, the control conductors 80a-80c may correspond to bits A, B and C while the control conductor 80d is a ground. The bits A, B and C may default to ground (e.g., a logical 0). The charging station 72, or any other device connected into the charging socket 92, may indicate the number of phases and the direction by pulling two or more of the bits A, B and C high (e.g., a logical 1). The bits A, B and C may indicate the mode per Table I as follows:

TABLE I

| A | B | C | Command |
|---|---|---|---|
| 0 | 0 | 0 | No connection |
| 0 | 0 | 1 | Error |
| 0 | 1 | 0 | Error |
| 0 | 1 | 1 | 1-Phase In |
| 1 | 0 | 0 | Error |
| 1 | 0 | 1 | 3-Phase In |
| 1 | 1 | 0 | 1-Phase Out |
| 1 | 1 | 1 | 3-Phase Out |

Other numbers of bits and/or other bit sequences may be implemented to meet the design criteria of a particular application.

Figure 4:
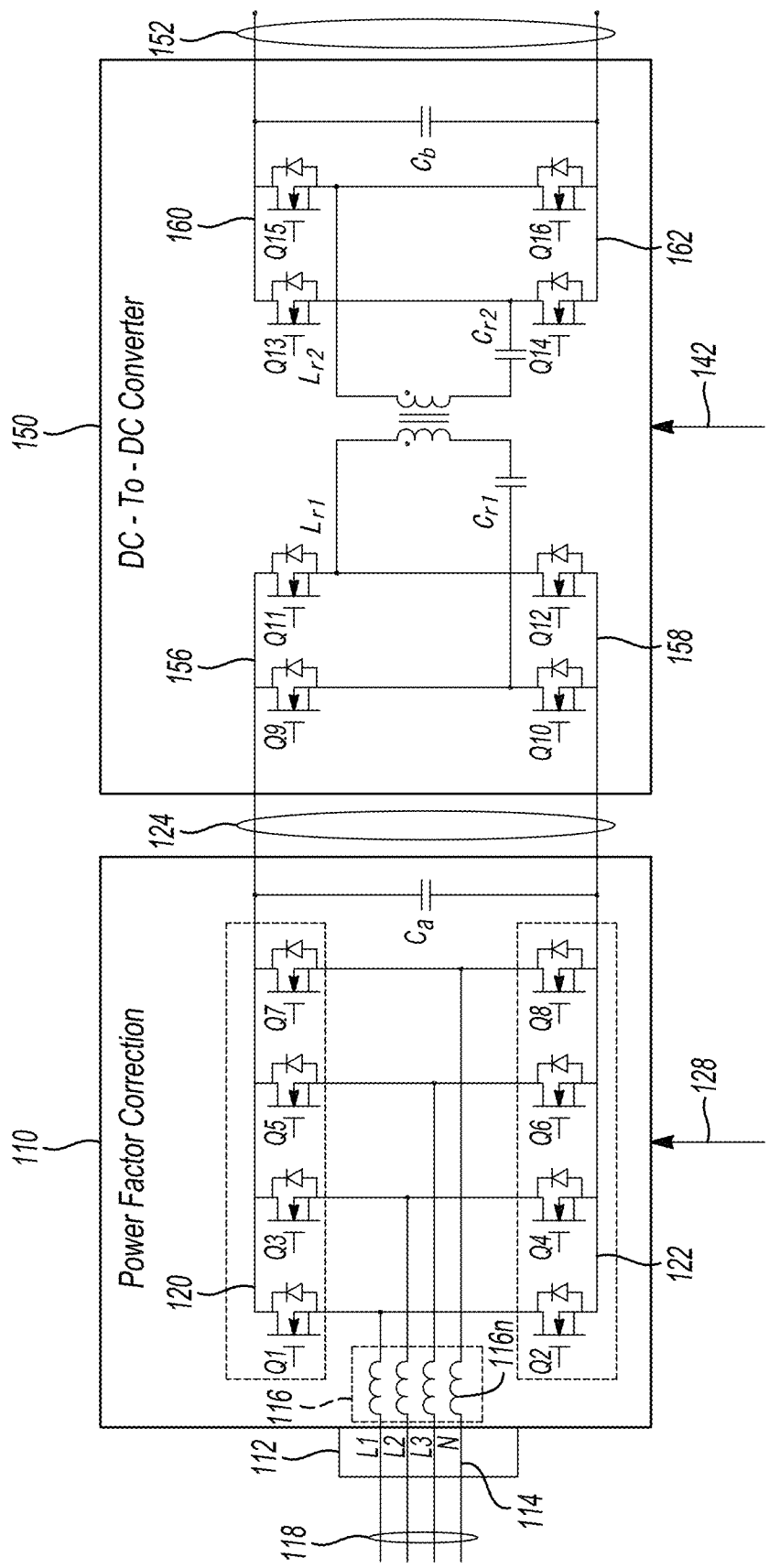
FIG. 4 is a schematic diagram of a power factor correction circuit and a DC-to-DC converter in accordance with one or more exemplary embodiments.

Referring to FIG. 4, a schematic diagram of an example implementation of the power factor correction circuit 110 and the DC-to-DC converter 150 are shown in accordance with one or more exemplary embodiments. The power factor correction circuit 110 generally includes the electrical interface 112, multiple inductors 116, a first power bus 120, a second power bus 122, multiple first transistors (Q1, Q3, Q5 and Q7), multiple second transistors (Q2, Q4, Q6, and Q8), and a capacitor Ca. The first DC electrical power 126 is established between the first power bus 120 and the second power bus 122.

The electrical interface 112 includes multiple (e.g., four) interface conductors 114 (or bus bars). One of the interface conductors 114 is coupled to the first line L1, the second line L2, the third line L3 and the neutral line N, respectively, in the charging socket 92. The interface conductors 114 convey currents 118. The utilization of two pairs of the interface conductors 114 operating in parallel while in the single-phase input mode generally allows smaller conductors to be implemented compared to normal power factor correction circuits that rely solely on the neutral line N to carry the current.

The inductors 116 are connected in series to a respective one of the four interface conductors 114. The inductors 116 are operational to store energy during half of each cycle of an active phase, and release the energy during the other half of the cycle. A particular inductor 116n among the inductors 116 is connected in series in the neutral line N. The particular inductor 116n may be operated in parallel with one of the other inductors 116 on lines L1, L2 or L3 while operating in the single-phase input mode. The utilization of two pairs of the inductors 116 operating in parallel while in the single-phase input mode generally allows smaller inductors to be implemented compared to normal power factor correction circuits that do not include the particular inductor 116n on the neutral line N. In the three-phase input mode, three of the inductors 116 may be utilized.

The first transistors Q1, Q3, Q5 and Q7 couple a respective one of the inductors 116 to the first power bus 120. The first transistors Q1, Q3, Q5 and Q7 are individually controlled by switching components of the switching signal 128.

The second transistors Q2, Q4, Q6 and Q8 couple a respective one of the inductors 116 to the second power bus 122. The second transistors Q2, Q4, Q6 and Q8 are individually controlled by the switching components of the switching signal 128. The switches Q1-Q8 may be MOSFETs, IGBTs, HEMTs, etc., inclusive of wideband gap semiconductors such as silicon carbide and gallium nitride. The utilization of two pairs of the transistors Q1-Q8 operating in parallel while in the single-phase input mode generally allows smaller transistors to be implemented compared to normal power factor correction circuits that rely solely on the neutral line N to carry the current.

The capacitor Ca is connected between the first power bus 120 and the second power bus 122. The capacitor Ca is operational to store energy during half of each cycle of the active phase (e.g., while the inductors 116 are releasing energy), and release the energy during the other half of the cycle (e.g., while the inductors 116 are storing energy).

The DC-to-DC converter 150 generally includes a third power bus 156, a fourth power bus 158, a fifth power bus 160, a sixth power bus 162, a transformer having a first winding Lr1 and a second winding Lr2, a capacitor Cr1, a capacitor Cr2, a capacitor Cb, and multiple third transistors (e.g., Q9 to Q16). The third transistors Q9 to Q16 are controlled by the controller 140 (see FIG. 2) via individual components of the DC conversion signal 142. The second DC electrical power 154 is established between the fifth power bus 160 and the sixth power bus 162.

The third power bus 156 is connected to the first winding Lr1 through the third transistors Q9 and Q11. The third power bus 156 is also connected to the first power bus 120 at the first DC electrical interface 124.

The fourth power bus 158 is connected to the first winding Lr1 through the capacitor Cr1 and the third transistors Q10 and Q12. The fourth power bus 158 is also connected to the second power bus 122 at the first DC electrical interface 124.

The fifth power bus 160 is connected to the second winding Lr2 through the third transistors Q13 and Q15. The fifth power bus 160 is also connected to the battery pack 98 (see FIG. 1) at the second DC electrical interface 152.

The sixth power bus 162 is connected to the second winding Lr2 through the capacitor Cr2 and the third transistors Q14 and Q16. The sixth power bus 162 is also connected to the battery pack 98 (see FIG. 1) at the second DC electrical interface 152. The switches Q9-Q18 may be MOSFETs, IGBTs, HEMTs, etc., inclusive of wideband gap semiconductors such as silicon carbide and gallium nitrite.

Figure 5:
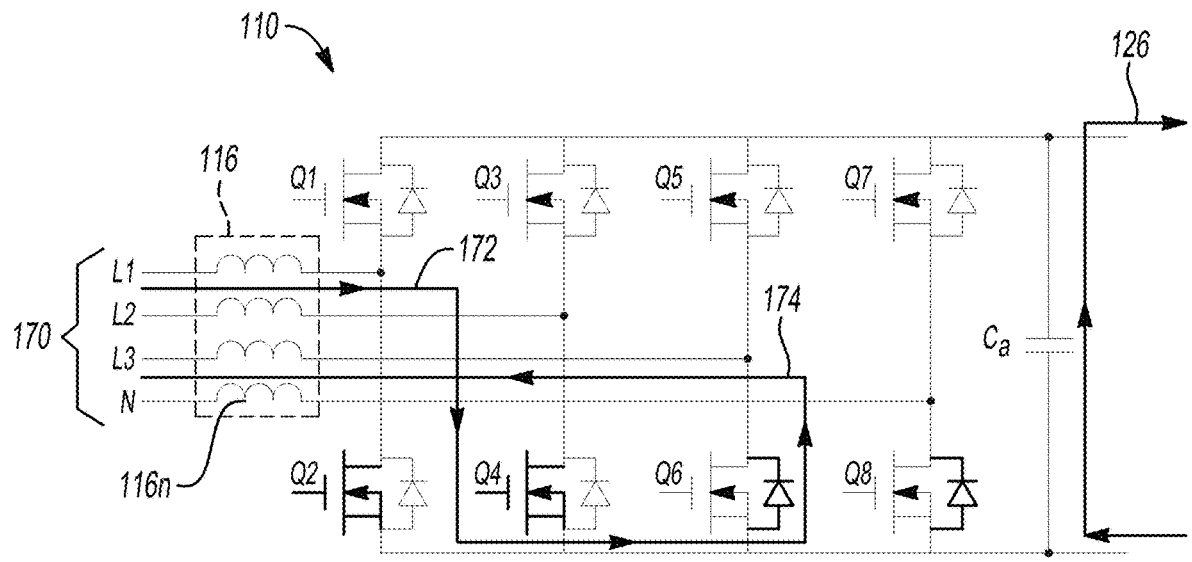
FIG. 5 is a schematic diagram of inductor charging in a single-phase input mode in accordance with one or more exemplary embodiments.

Referring to FIG. 5, a schematic diagram of an example inductor charging in the single-phase input mode is shown in accordance with one or more exemplary embodiments. An input single-phase electrical power 170 generally has a sinusoidal voltage. While the input single-phase electrical power 170 causes the current 118 through the inductors 116 to rise and an amplitude of the voltage of an active phase 172 is greater than zero volts relative to a return phase 174, the controller 140 switches on the second transistors Q2, Q4, Q6 and Q8, and switches off the first transistors Q1, Q3, Q5, and Q7. The active second transistors Q2, Q4, Q6 and Q8 allow the current 118 to build magnetic fields around the inductors 116 thereby storing energy. Concurrently, the capacitor Ca discharges to provide the first DC electrical power 126 to the DC-to-DC converter 150.

Figure 6:
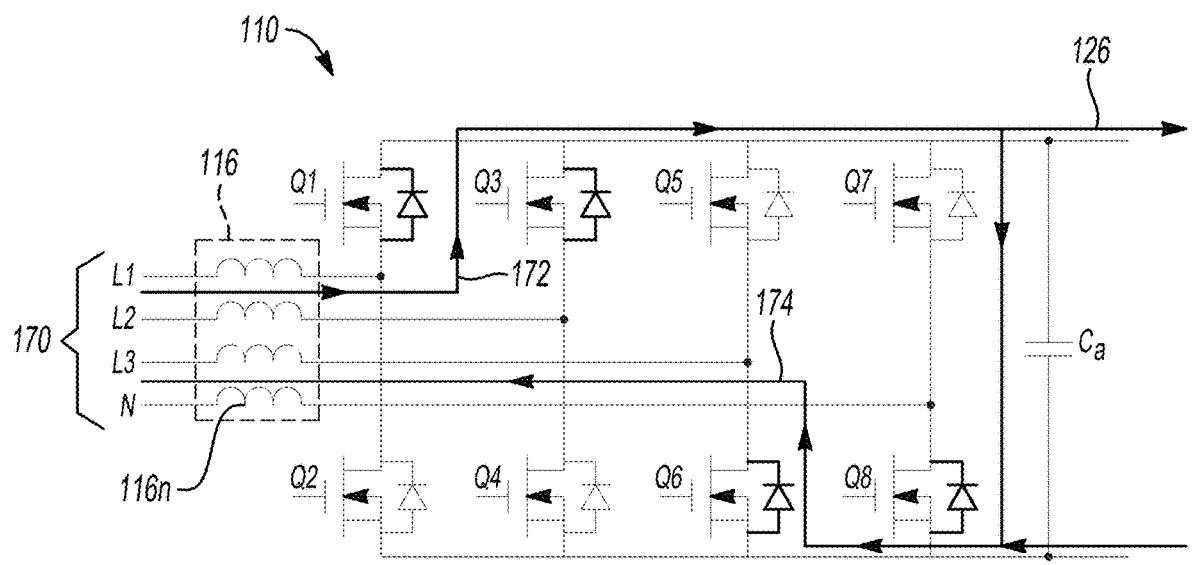
FIG. 6 is a schematic diagram of inductor discharging in the single-phase input mode in accordance with one or more exemplary embodiments.

Referring to FIG. 6, a schematic diagram of an example inductor discharging in the single-phase input mode is shown in accordance with one or more exemplary embodiments. While the input single-phase electrical power 170 causes the current 118 through the inductors 116 to fall and the amplitude of the voltage of the active phase 172 is greater than zero volts relative to the return phase 174, the controller 140 switches on two of the first transistors (e.g., Q1 and Q3) and two of the second transistors (e.g., Q6 and Q8). The remaining transistors (e.g., Q2, Q3, Q4, and Q5) are switched off. The active first transistors Q1 and Q3 and the active second transistors Q6 and Q8 allow the magnetic fields around the inductors 116 to collapse thereby providing the first DC electrical power 126 to the DC-to-DC converter 150. Concurrently, the capacitor Ca is charged by the first DC electrical power 126.

Figure 7:
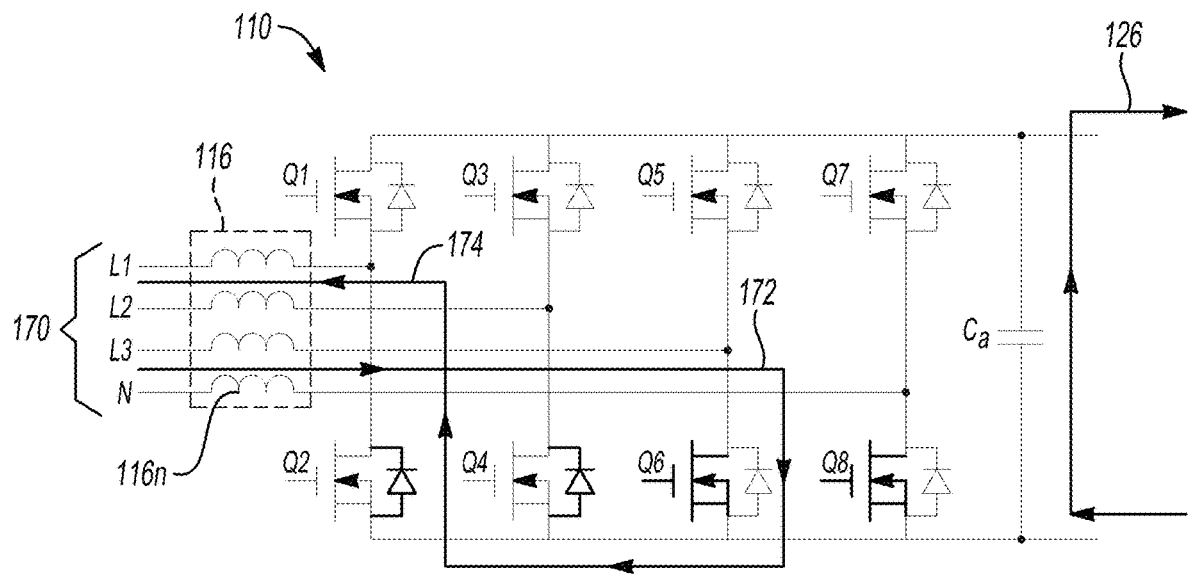
FIG. 7 is a schematic diagram of additional inductor charging in the single-phase input mode in accordance with one or more exemplary embodiments.

Referring to FIG. 7, a schematic diagram of an example inductor charging in the single-phase input mode is shown in accordance with one or more exemplary embodiments. While the input single-phase electrical power 170 causes the current 118 through the inductors 116 to rise and the amplitude of voltage of the active phase 172 is less than zero volts relative to the return phase 174, the controller 140 switches on the second transistors Q2, Q4, Q6 and Q8, and switches off the first transistors Q1, Q3, Q5, and Q7. The active second transistors Q2, Q4, Q6 and Q8 allow the current 118 to build magnetic fields around the inductors 116 thereby storing energy. Concurrently, the capacitor Ca discharges to provide the first DC electrical power 126 to the DC-to-DC converter 150.

Figure 8:
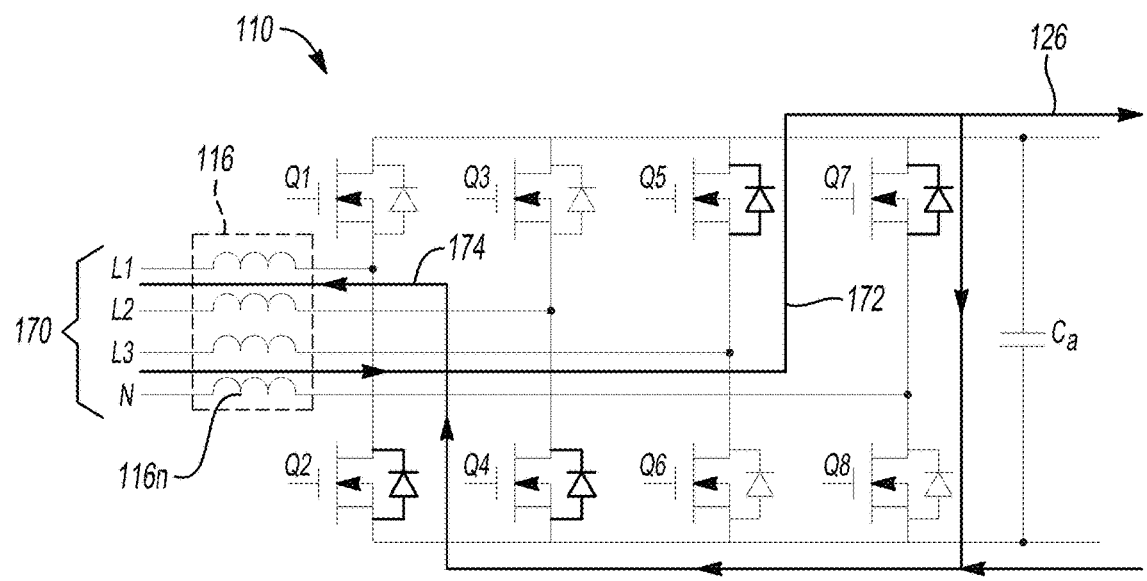
FIG. 8 is a schematic diagram of additional inductor discharging in the single-phase input mode in accordance with one or more exemplary embodiments.

Referring to FIG. 8, a schematic diagram of an example inductor discharging in the single-phase input mode is shown in accordance with one or more exemplary embodiments. While the input single-phase electrical power 170 causes the current 118 through the inductors 116 to fall and the amplitude of the voltage of the active phase 172 is less than zero volts relative to the return phase 174, the controller 140 switches on two of the first transistors (e.g., Q5 and Q7) and two of the second transistors (e.g., Q2 and Q4). The remaining transistors (e.g., Q1, Q3, Q6, and Q8) are switched off. The active first transistors Q5 and Q7 and the active second transistors Q2 and Q4 allow the magnetic fields around the inductors 116 to collapse thereby providing the first DC electrical power 126 to the DC-to-DC converter 150. Concurrently, the capacitor Ca is charged by the first DC electrical power 126.

Figure 9:
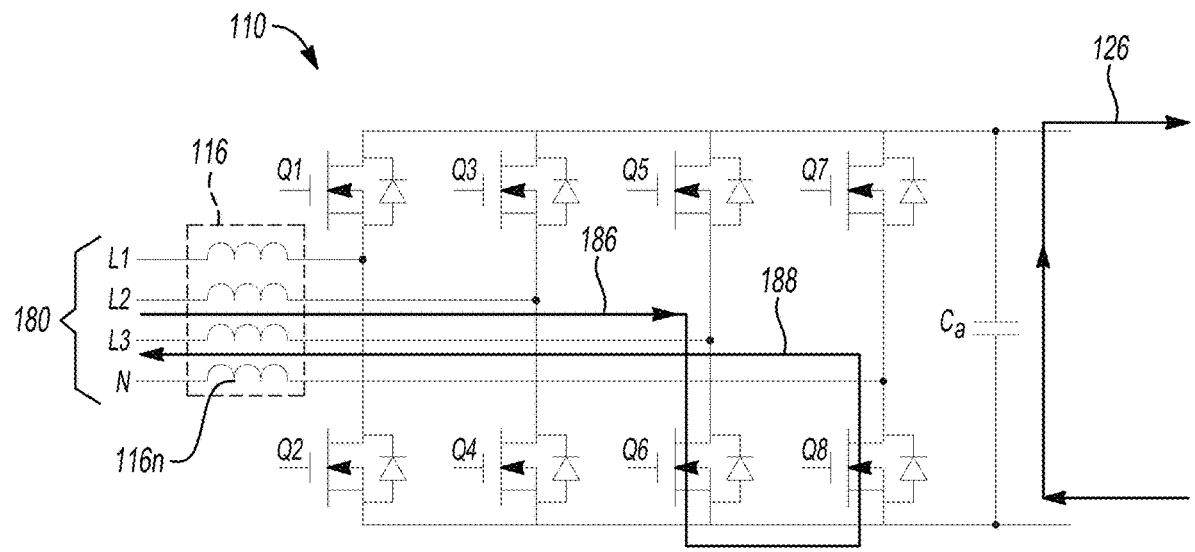
FIG. 9 is schematic diagram of inductor charging in the three-phase input mode in accordance with one or more exemplary embodiments.

Referring to FIG. 9, a schematic diagram of an example inductor charging in the three-phase input mode is shown in accordance with one or more exemplary embodiments. Consider just the third line L3. An input three-phase electrical power 180 generally has a sinusoidal voltage on each active phase. The three active phase voltages may be separated from each other by 120 degrees. While the input three-phase electrical power 180 causes the current 118 through the inductors 116 in the third line L3 to rise and an amplitude of the voltage of a corresponding active phase (e.g., 186) is greater than zero volts relative to a return phase 188, the controller 140 switches on the first transistor Q6. The active first transistor Q6 allows the current 118 to build a magnetic field around the corresponding inductor 116 thereby storing energy. Concurrently, the capacitor Ca discharges to provide the first DC electrical power 126 to the DC-to-DC converter 150. Similar inductor charging occurs on the first line L1 and the second line L2 at other times.

Figure 10:
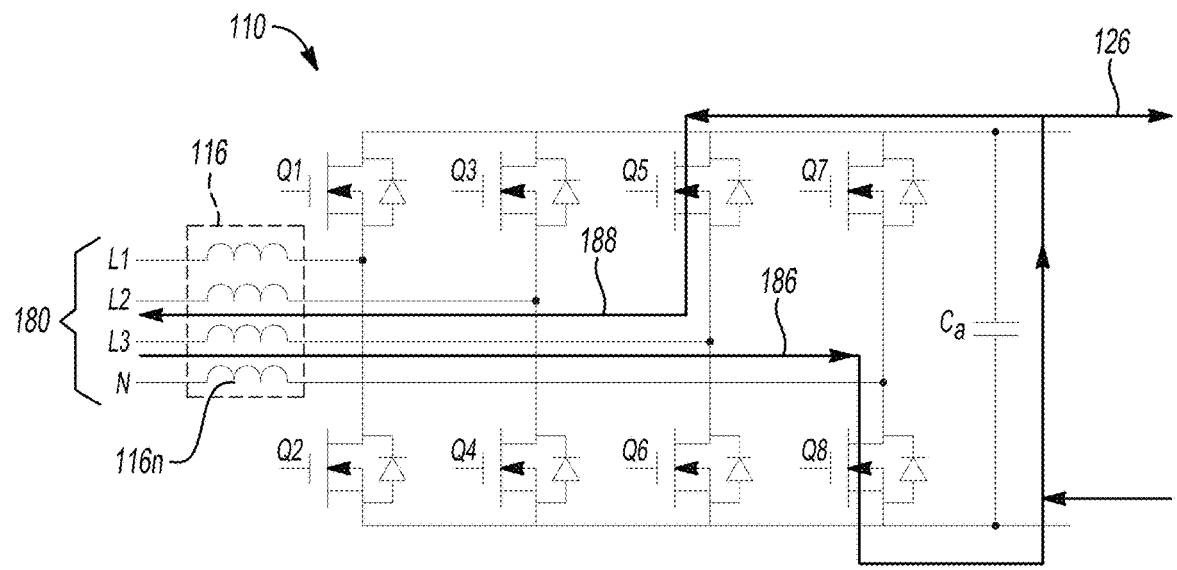
FIG. 10 is schematic diagram of inductor discharging in the three-phase input mode in accordance with one or more exemplary embodiments.

Referring to FIG. 10, a schematic diagram of an example inductor discharging in the three-phase input mode is shown in accordance with one or more exemplary embodiments. Consider just the third line L3. While the input three-phase electrical power 180 causes the current 118 through the inductors 116 in the third line L3 to fall and the amplitude of the voltage of the corresponding active phase 186 is greater than zero volts relative to the return phase 188, the controller 140 switches on the first transistor Q8 and a second transistor Q5. The active second transistor Q5 and the first transistor Q8 allow the magnetic field around the corresponding inductor 116 to collapse thereby providing the first DC electrical power 126 to the DC-to-DC converter 150. Concurrently, the capacitor Ca is charged by the first DC electrical power 126. Similar inductor discharging occurs on the first line L1 and the second line L2 at other times.

Referring to FIGS. 1, 2 and 11, a flow diagram of an example method 220 for power conversion is shown in accordance with one or more exemplary embodiments. The method (or process) 220 is implemented by the power converter 100. The method 220 includes steps 222 to 232, as illustrated. The sequence of steps is shown as a representative example. Other step orders may be implemented to meet the criteria of a particular application.

In the step 222, the controller 140 receives the control signal 80 indicating the direction and number of phases of the electrical power 78. The controller 140 subsequently configures the power factor correction circuit 110 and the DC-to-DC converter 150 in the step 224 based on the data received in the control signal 80. The controller 140 may signal the charging station 72 via the communication signal 84 an ability to start transferring power in the step 226. While the power converter 100 is operating in the single-phase input mode or the three-phase input mode, the power converter 100 receives the AC electrical power 78 from the charging station 72. While the power converter 100 is operating in the single-phase output mode or the three-phase output mode, the power converter 100 presents the AC electrical power 78 at the charging socket 92 in the step 230.

Once the power transfer is complete, the controller 140 may signal a stop to the transfer in the step 232 via the communication signal 84.

Referring to FIGS. 1, 2 and 12, a flow diagram of an example method 228a for receiving the single-phase electrical power 78 is shown in accordance with one or more exemplary embodiments. The method (or process) 228a implements the step 228 in the method 220. The method 228a includes steps 240 to 248, as illustrated. The sequence of steps is shown as a representative example. Other step orders may be implemented to meet the criteria of a particular application.

In the step 240, the power factor correction circuit 110 receives the electrical power 78 through the four socket conductors 94 of an electrical interface 112. The controller 140 generates the switching signal 128 in the step 242 to control the power factor correction circuit 110 to operate in the single-phase input mode in response to a first command (e.g., the single-phase input mode) received via the control signal 80. The power factor correction circuit 110 converts the input single-phase electrical power 78 to the first DC electrical power 126 in the power factor correction circuit 110 operating in a single-phase input mode in the step 244. In the step 246, the DC-to-DC converter 150 converts (e.g., up converts) the first DC electrical power 126 to the second DC electrical power 154. The second DC electrical power 154 charges the battery pack 98 in the step 248.

Referring to FIGS. 1, 2 and 13, a flow diagram of an example method 228b for receiving the three-phase electrical power 78 is shown in accordance with one or more exemplary embodiments. The method (or process) 228b implements the step 228 in the method 220. The method 228b includes steps 240, 250, 252, 246, and 248, as illustrated. The sequence of steps is shown as a representative example. Other step orders may be implemented to meet the criteria of a particular application.

In the step 240, the power factor correction circuit 110 receives the electrical power 78 through the four socket conductors 94 of the electrical interface 112. In the step 250, the controller 140 generates the switching signal 128 to control the power factor correction circuit 110 to operate in the three-phase input mode in response to a second command received via the control signal 80. The power factor correction circuit 110 converts the input three-phase electrical power in the step 252 to the first DC electrical power 126 while operating in the three-phase input mode. In the step 246, the DC-to-DC converter 150 converts (e.g., up converts) the first DC electrical power 126 to the second DC electrical power 154. The second DC electrical power 154 charges the battery pack 98 in the step 248.

Referring to FIGS. 1, 2 and 14, a flow diagram of an example method 230a for presenting single-phase electrical power 78 is shown in accordance with one or more exemplary embodiments. The method (or process) 230a implements the step 230 in the method 220. The method 230a includes steps 260 to 268, as illustrated. The sequence of steps is shown as a representative example. Other step orders may be implemented to meet the criteria of a particular application.

In the step 260, the DC-to-DC converter 150 draws the second DC electrical power 154 from the battery pack 98. The DC-to-DC converter 150 subsequently converts (e.g., down converts) the second DC electrical power 154 to the first DC electrical power 126 in the step 262. In the step 264, the controller 140 controls the power factor correction circuit 110 to operate in the single-phase output mode in response to a third command received via the control signal 80. The power factor correction circuit 110 converts the first DC electrical power 126 to the output single-phase electrical power 78 in the step 266 while operating in a single-phase output mode. In the step 268, the output single-phase electrical power 78 is presented at the electrical interface 112 and the charging socket 92.

Referring to FIGS. 1, 2 and 15, a flow diagram of an example method 230b for presenting three-phase electrical power 78 is shown in accordance with one or more exemplary embodiments. The method (or process) 230b implements the step 230 in the method 220. The method 230b includes steps 260, 262, and 270 to 274, as illustrated. The sequence of steps is shown as a representative example. Other step orders may be implemented to meet the criteria of a particular application.

In the step 260, the DC-to-DC converter 150 draws the second DC electrical power 154 from the battery pack 98. The DC-to-DC converter 150 subsequently converts (e.g., down converts) the second DC electrical power 154 to the first DC electrical power 126 in the step 262. In the step 270, the controller 140 controls the power factor correction circuit 110 to operate in the three-phase output mode in response to a fourth command received via the control signal 80. The power factor correction circuit 110 converts the first DC electrical power 126 to the output three-phase electrical power 78 in the step 272 while operating in a three-phase output mode. In the step 274, the output three-phase electrical power 78 is presented at the electrical interface 112 and the charging socket 92.

Embodiments of the power converter 100 generally enables a reduced sizing of the components to support lower power criteria through each component, which may result in lower component cost and higher system efficiency through reduced heat generation and other losses. Furthermore, redundancy within the power factor correction circuit 110 enables improved functional safety, performance, fault tolerance, and the like.

The redundancy in the single-phase mode is generally enabled through the inductor 116n on the neutral line N. If one of the input lines and/or one of the return lines were to have a fault (e.g., open circuit), the second line (either on the input and/or the return) may take the full load. For example where the line L3 and the neutral line N are used for the return as shown in FIG. 5, if the third line L3 becomes an open circuit, the neutral line N still functions as the return path. If the neutral line N experiences an open circuit, the third line L3 still functions as the return path. Likewise, if the first line L1 experiences an open circuit, the second line L2 still functions as the input path. If the second line L2 becomes an open circuit, the first line L1 still functions as the input path. The power being transferred may either be derated to account for the loss of the line(s), or the components may be sized to carry the full single-phase load.

The redundancy in the three-phase mode is enabled by an ability to accept power through lines L1, L2 and L3 without involving the neutral line N. For example, two of the input phases (e.g., on the first line L1 and the second line L2) may utilize the other phase (e.g., the third line L3) as the return path if the neutral line N is no longer available (e.g., a three-phase delta configuration).

Those having ordinary skill in the art will recognize that terms such as "above," "below," "front," "back," "upward," "downward," "top," "bottom," etc., may be used descriptively herein without representing limitations on the scope of the disclosure. Furthermore, the present teachings may be described in terms of functional and/or logical block components and/or various processing steps. Such block components may be comprised of various hardware components, software components executing on hardware, and/or firmware components executing on hardware.

The foregoing detailed description and the drawings are supportive and descriptive of the disclosure, but the scope of the disclosure is defined solely by the claims. As will be appreciated by those of ordinary skill in the art, various alternative designs and embodiments may exist for practicing the disclosure defined in the appended claims.

The invention claimed is:

1. A power converter comprising:
a power factor correction circuit having an electrical interface with four interface conductors, the power factor correction circuit being configured to:
convert an input single-phase electrical power to a first DC electrical power while operating in a single-phase input mode, wherein
an active phase of the input single-phase electrical power is received in parallel through a first conductor and a second conductor of the four interface conductors; and
a return phase of the input single-phase electrical power is received in parallel through a third conductor and a fourth conductor of the four interface conductors; and
convert an input three-phase electrical power to the first DC electrical power while operating in a three-phase input mode; wherein
a first phase of the input three-phase electrical power is received through the first conductor of the four interface conductors;
a second phase of the input three-phase electrical power is received through the second conductor of the four interface conductors;
a third phase of the input three-phase electrical power is received through the third conductor of the four interface conductors; and
the return phase of the input three-phase electrical power the fourth conductor of the four interface conductors; and
a controller configured to control the power factor correction circuit to:
operate in the single-phase input mode in response to a first command received via a control signal; and
operate in the three-phase input mode in response to a second command received via the control signal.

2. The power converter according to claim 1, wherein the power factor correction circuit includes:
four inductors connected in series with the four interface conductors respectively, wherein the four interface conductors are configured to transfer four currents;
a plurality of first transistors controlled by the controller to selectively switch the four inductors to a first power bus; and
a plurality of second transistors controlled by the controller to selectively switch the four inductors to a second power bus, wherein the first DC electrical power is established between the first power bus and the second power bus.

3. The power converter according to claim 2, wherein the plurality of second transistors switch the four inductors to the second power bus in response to a voltage of the active phase relative to the return phase being greater than zero volts and the four amplitudes of the four currents in the four inductors are rising while in the single-phase input mode.

4. The power converter according to claim 3, wherein:
the plurality of first transistors switch two of the four inductors to the first power bus in response to the voltage of the active phase relative to the return phase being greater than zero volts and the four amplitudes of the four currents in the four inductors are falling while in the single-phase input mode; and
the plurality of second transistors switch two of the four inductors to the second power bus in response to the voltage of the active phase relative to the return phase being greater than zero volts and the four amplitudes of the four currents in the four inductors are falling while in the single-phase input mode.

5. The power converter according to claim 3, wherein the plurality of second transistors switch the four inductors to the second power bus in response to the voltage of the active phase relative to the return phase being less than zero volts and the four amplitudes of the four currents in the four inductors are rising while in the single-phase input mode.

6. The power converter according to claim 5, wherein:
the plurality of first transistors switch two of the four inductors to the first power bus in response to a voltage of the active phase relative to the return phase being less than zero volts and the four amplitudes of the four currents in the four inductors are falling while in the single-phase input mode; and
the plurality of second transistors switch two of the four inductors to the second power bus in response to the voltage of the active phase relative to the return phase being less than zero volts and the four amplitudes of the four currents in the four inductors are falling while in the single-phase input mode.

7. The power converter according to claim 1, further comprising:
a DC-to-DC converter configured to convert the first DC electrical power to a second DC electrical power, wherein the second DC electrical power has a different voltage than the first DC electrical power.

8. The power converter according to claim 1, wherein:
the power factor correction circuit is further configured to:
convert the first DC electrical power to an output single-phase electrical power while operating in a single-phase output mode;
present the output single-phase electrical power at the electrical interface;
convert the first DC electrical power to an output three-phase electrical power while operating in a three-phase output mode; and
present the output three-phase electrical power at the electrical interface; and
the controller is further configured to control the power factor correction circuit to:
operate in the single-phase output mode in response to a third command received via the control signal; and
operate in the three-phase output mode in response to a fourth command received via the control signal.

9. The power converter according to claim 1, wherein the power factor correction circuit and the controller are implemented in a vehicle.

10. A method for power conversion comprising:
receiving electrical power through four interface conductors of an electrical interface of a power factor correction circuit;
converting an input single-phase electrical power to a first DC electrical power in the power factor correction circuit operating in a single-phase input mode, wherein an active phase of the input single-phase electrical power is received in parallel through a first conductor and a second conductor of the four interface conductors; and a return phase of the input single-phase electrical power is received in parallel through a third conductor and a fourth conductor of the four interface conductors;

converting an input three-phase electrical power to the first DC electrical power in the power factor correction circuit operating in a three-phase input mode, wherein a first phase of the input three-phase electrical power is received through the first conductor of the four interface conductors;

a second phase of the input three-phase electrical power is received through the second conductor of the four interface conductors;

a third phase of the input three-phase electrical power is received through the third conductor of the four interface conductors; and the return phase of the input three-phase electrical power the fourth conductor of the four interface conductors;

controlling the power factor correction circuit with a controller to operate in the single-phase input mode in response to a first command received via a control signal; and controlling the power factor correction circuit with the controller to operate in the three-phase input mode in response to a second command received via the control signal.

11. The method according to claim 10, wherein the power factor correction circuit includes:

four inductors connected in series with the four interface conductors respectively, wherein the four interface conductors are configured to transfer four currents;

a plurality of first transistors controlled by the controller to selectively switch the four inductors to a first power bus; and a plurality of second transistors controlled by the controller to selectively switch the four inductors to a second power bus, wherein the first DC electrical power is established between the first power bus and the second power bus.

12. The method according to claim 11, further comprising:

switching the four inductors through the plurality of second transistors to the second power bus in response to a voltage of the active phase relative to the return phase being greater than zero volts and the four amplitudes of the four currents in the four inductors are rising while in the single-phase input mode.

13. The method according to claim 12, further comprising:

switching two of the four inductors through the plurality of first transistors to the first power bus in response to the voltage of the active phase relative to the return phase being greater than zero volts and the four amplitudes of the four currents in the four inductors are falling while in the single-phase input mode; and switching two of the four inductors through the plurality of second transistors to the second power bus in response to the voltage of the active phase relative to the return phase being greater than zero volts and the four amplitudes of the four currents in the four inductors are falling while in the single-phase input mode.

14. The method according to claim 12, further comprising:

switching the four inductors through the plurality of second transistors to the second power bus in response to the voltage of the active phase relative to the return phase being less than zero volts and the four amplitudes of the four currents in the four inductors are rising while in the single-phase input mode.

15. The method according to claim 14, further comprising:

switching two of the four inductors through the plurality of first transistors to the first power bus in response to a voltage of the active phase relative to the return phase being less than zero volts and the four amplitudes of the four currents in the four inductors are falling while in the single-phase input mode; and switching two of the four inductors through the plurality of second transistors to the second power bus in response to the voltage of the active phase relative to the return phase being less than zero volts and the four amplitudes of the four currents in the four inductors are falling while in the single-phase input mode.

16. The method according to claim 10, further comprising:

converting the first DC electrical power to a second DC electrical power, wherein the second DC electrical power has a different voltage than the first DC electrical power.

17. The method according to claim 10, further comprising:

converting the first DC electrical power to an output single-phase electrical power in the power factor correction circuit operating in a single-phase output mode;

presenting the output single-phase electrical power at the electrical interface;

converting the first DC electrical power to an output three-phase electrical power in the power factor correction circuit operating in a three-phase output mode;

presenting the output three-phase electrical power at the electrical interface;

controlling the power factor correction circuit to operate in the single-phase output mode in response to a third command received via the control signal; and controlling the power factor correction circuit to operate in the three-phase output mode in response to a fourth command received via the control signal.

18. A vehicle comprising:

a charging socket having at least four socket conductors;

a power factor correction circuit electrically connected to the charging socket, the power factor correction circuit being configured to:

convert an input single-phase electrical power to a first DC electrical power while operating in a single-phase input mode, wherein an active phase of the input single-phase electrical power is received in parallel through a first socket conductor and a second socket conductor of the four socket conductors; and a return phase of the input single-phase electrical power is received in parallel through a third socket conductor and a fourth socket conductor of the four socket conductors; and convert an input three-phase electrical power to the first DC electrical power while operating in a three-phase input mode, wherein a first phase of the input three-phase electrical power is received through the first socket conductor of the four socket conductors;

a second phase of the input three-phase electrical power is received through the second socket conductor of the four socket conductors;

a third phase of the input three-phase electrical power is received through the third socket conductor of the four socket conductors; and the return phase of the input three-phase electrical power the fourth socket conductor of the four socket conductors; and a controller configured to control the power factor correction circuit to:

operate in the single-phase input mode in response to a first command received via a control signal; and operate in the three-phase input mode in response to a second command received via the control signal.

19. The vehicle according to claim 18, further comprising:

a DC-to-DC converter configured to bidirectionally convert between the first DC electrical power and a second DC electrical power, wherein the second DC electrical power has a different voltage than the first DC electrical power; and a battery pack electrically coupled to the DC-to-DC converter, configured to receive the second DC electrical power from the DC-to-DC converter while in a charging mode, and configured to present the second DC electrical power to the DC-to-DC converter while in a discharging mode.

20. The vehicle according to claim 19, wherein:

the power factor correction circuit is further configured to:

convert the first DC electrical power to an output single-phase electrical power while operating in a single-phase output mode;

present the output single-phase electrical power to the charging socket;

convert the first DC electrical power to an output three-phase electrical power while operating in a three-phase output mode; and present the output three-phase electrical power to the charging socket; and the controller is further configured to control the power factor correction circuit to:

operate in the single-phase output mode in response to a third command received via the control signal; and operate in the three-phase output mode in response to a fourth command received via the control signal.

\* \* \* \* \*